United States Patent
Akutsu (10) Patent No.: US 8,526,681 B2
(45) Date of Patent: Sep. 3, 2013

(54) ON-VEHICLE IMAGE PROCESSING DEVICE FOR VEHICULAR CONTROL

(75) Inventor: Eisaku Akutsu, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 511 days.

(21) Appl. No.: 12/601,389

(22) PCT Filed: Jul. 17, 2008

(86) PCT No.: PCT/JP2008/063334
§ 371 (c)(1),
(2), (4) Date: Nov. 23, 2009

(87) PCT Pub. No.: WO2009/011458
PCT Pub. Date: Jan. 22, 2009

(65) Prior Publication Data
US 2010/0172547 A1   Jul. 8, 2010

(30) Foreign Application Priority Data

Jul. 17, 2007   (JP) .................................. 2007-186089

(51) Int. Cl.
*G06K 9/00* (2006.01)
(52) U.S. Cl.
USPC ........................................... 382/107; 701/75
(58) Field of Classification Search
None
See application file for complete search history.

(56) References Cited

U.S. PATENT DOCUMENTS

| 6,611,202 | B2 * | 8/2003 | Schofield et al. | 340/461 |
| 7,551,103 | B2 * | 6/2009 | Schofield | 340/903 |
| 2005/0179527 | A1 * | 8/2005 | Schofield | 340/435 |
| 2008/0143835 | A1 * | 6/2008 | Abe et al. | 348/148 |
| 2010/0034426 | A1 * | 2/2010 | Takiguchi et al. | 382/106 |
| 2010/0110193 | A1 * | 5/2010 | Kobayashi | 348/149 |
| 2010/0172547 | A1 * | 7/2010 | Akutsu | 382/107 |

FOREIGN PATENT DOCUMENTS

| EP | 0 896 267 A2 | 2/1999 |
| JP | A-1-273746 | 1/1989 |
| JP | A-3-186713 | 8/1991 |
| JP | A-7-77431 | 3/1995 |
| JP | A-7-89443 | 4/1995 |
| JP | A-2000-285245 | 10/2000 |
| JP | A-2002-109695 | 4/2002 |
| JP | A-2003-67752 | 3/2003 |
| JP | A-2006-151122 | 6/2006 |
| JP | A-2006-285910 | 10/2006 |

(Continued)

OTHER PUBLICATIONS

International Search Report for International Application No. PCT/JP2008/063334, issued Oct. 14, 2008.

(Continued)

*Primary Examiner* — Bhavesh Mehta
*Assistant Examiner* — Tahmina Ansari
(74) *Attorney, Agent, or Firm* — Oliff & Berridge, PLC (57) ABSTRACT

An image processing device includes a first camera that captures the periphery of a vehicle, specific region extracting units that extract regions, each of which is closer to the edge of an image than to the center of the image, as specific regions, and a movement amount calculating unit that calculates the amount of movement of the vehicle on the basis of image information in a plurality of specific regions. Therefore, it is possible to process only the first specific region and the second specific region of the captured image and thus effectively perform image processing.

8 Claims, 9 Drawing Sheets

(56) References Cited

FOREIGN PATENT DOCUMENTS

| JP | A-2006-318272 | | 11/2006 |
|---|---|---|---|
| JP | A-2007-129560 | | 5/2007 |
| WO | WO2008/099915 | * | 8/2008 |

OTHER PUBLICATIONS

Translation of Apr. 8, 2010 International Preliminary Report on Patentability issued in International Application No. PCT/JP2008/063334.

May 7, 2012 Supplementary Search Report issued in European Patent Application No. 08791584.9.

Dickmanns, et al., "Recursive 3-D Road and Relative Ego-State Recognition," *IEEE Transactions on Pattern Analysis and Machine Intelligence*, Feb. 1, 1992, p. 199-213, vol. 14, No. 2, IEEE Service Center, Los Alamitos, California.

Yamaguchi, et al., "Vehicle Ego-Motion Estimation and Moving Object Detection using a Monocular Camera," *The 18th International Conference on Pattern Recognition*, Sep. 20, 2006, p. 1-4, IEEE Computer Society, Los Alamitos, California.

Japanese Office Action issued in Japanese Patent Application No. 2009-090319 on May 25, 2010 (with translation).

* cited by examiner

ON-VEHICLE IMAGE PROCESSING DEVICE
FOR VEHICULAR CONTROL

TECHNICAL FIELD

The present invention relates to an on-vehicle image processing device.

BACKGROUND ART

A device has been proposed which uses image information captured by, for example, an on-vehicle camera in order to control the driving of a vehicle (for example, see JP-A-7-89443). The device limits an image processing range and controls the vehicle such that there is an object in the limited range.

DISCLOSURE OF THE INVENTION

However, in the image processing device according to the related art, when an object on the screen is moved a long distance, it is necessary to process a relatively large image region in order to follow the object, which may result in an increase in the load of image processing. Similarly, when the image processing device has a function of detecting the amount of movement of the vehicle from the displacement of the object, it is also necessary to process a relatively large image region.

Accordingly, the invention has been made in order to solve the above-mentioned problems, and an object of the invention is to provide an image processing device that effectively performs image processing for calculating the amount of movement of a vehicle while maintaining the calculation accuracy of the amount of movement.

That is, an image processing device according to an aspect of the invention includes: a first imaging unit that captures the periphery of a vehicle as image information; a specific region extracting unit that extracts a plurality of specific regions each of which is closer to the edge of an image region composed of the image information than to the center of the image region; and a movement amount calculating unit that calculates the amount of movement of the vehicle on the basis of image information in the plurality of specific regions.

According to the above-mentioned structure, the image processing device can process only a predetermined specific region in the image region composed of the captured image information. Therefore, it is possible to effectively perform image processing. In addition, since the image processing device extracts, from the image region, a plurality of specific regions each of which is closer to the edge of the image region, in which the displacement of the captured object is large, than to the center of the image region, it is possible to accurately check the displacement of an image in the vertical direction and the horizontal direction and thus calculate the amount of movement of the vehicle. Therefore, it is possible to effectively calculate the amount of movement of the vehicle while ensuring the accuracy.

In the image processing device according to the above-mentioned aspect, in left-hand traffic, the specific region extracting unit may extract an upper left region of the image region with respect to the center as a first specific region and a lower right region of the image region with respect to the center as a second specific region.

According to the above-mentioned structure, in the case of left-hand traffic, the image processing device can extract the upper left region and the lower right region of the entire region of the image information with respect to the center as the specific regions. Therefore, it is possible to accurately place objects serving as feature points, such as a building or a traffic sign disposed on the upper left side of the traveling direction, and a white line or a center divider disposed on the lower right side of the traveling direction, into the specific regions.

The image processing device according to the above-mentioned aspect may further include: a second imaging unit that has an angle of view less than that of the first imaging unit; and a first image correcting unit that corrects an image captured by the second imaging unit on the basis of the amount of movement acquired by the movement amount acquiring unit.

According to the above-mentioned structure, it is possible to acquire a plurality of images using the imaging units with different angles of view. In this case, the amount of image information of the image captured by the first imaging unit (wide-angle imaging unit), which has an angle of view more than that of the second imaging unit, is more than that of the image captured by the second imaging unit (narrow-angle imaging unit) in the imaging direction. Therefore, it is possible to more accurately check the displacement of an image by using the image captured by the wide-angle imaging unit to detect the displacement of an object. As such, when a plurality of imaging units with different angles of view is provided, the image captured by the imaging unit with a large angle of view is used to calculate the amount of movement of the vehicle, and the image captured by the other imaging unit is corrected on the basis of the calculated amount of movement of the vehicle. Therefore, it is possible to accurately correct an image.

The image processing device according to the above-mentioned aspect may further include: a central region extracting unit that extracts a central region of the image region from the image region; and a second image correcting unit that corrects the image of the central region extracted by the central region extracting unit on the basis of the amount of movement acquired by the movement amount acquiring unit.

According to the above-mentioned structure, it is possible to extract the central region of the image information and acquire two images, that is, the entire image and the image of the central region. In this way, it is possible to correct the image of the central region on the basis of the amount of movement calculated from a specific region that is closer to the edge of the image region. The image of the central region corresponds to an image captured by a telephoto imaging unit (narrow-angle imaging unit) and the image of a specific region close to the edge corresponds to an image captured by a wide-angle imaging unit. Therefore, it is possible to accurately correct telephoto image processing using one image, without using two imaging units.

BEST MODE FOR CARRYING OUT THE INVENTION

Hereinafter, exemplary embodiments of the invention will be described in detail with reference to the accompanying drawings. In the drawings, the same components are denoted by the same reference numerals, and a repeated description thereof will be omitted.

First Embodiment

Figure 1:
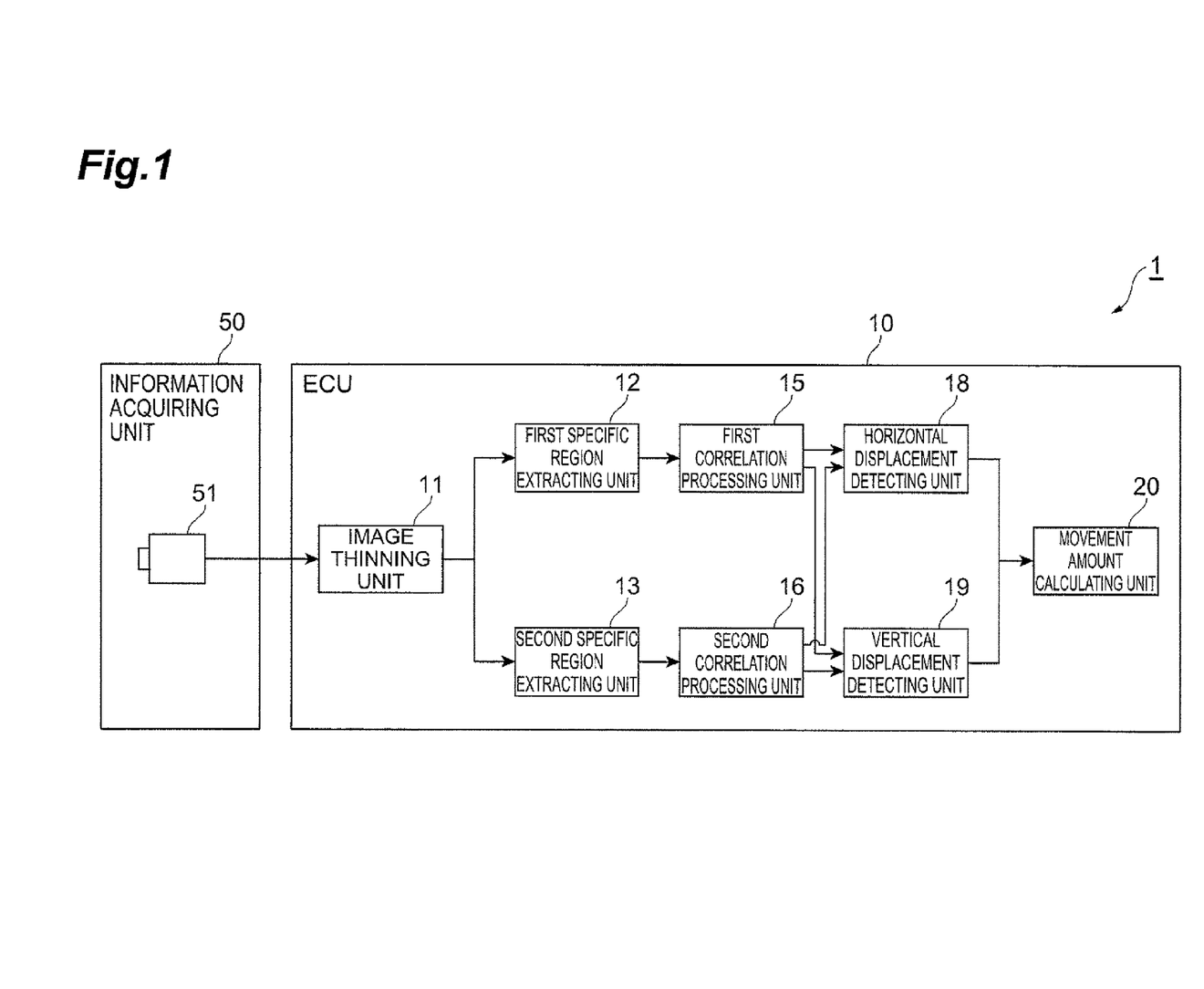
FIG. 1 is a diagram schematically illustrating the structure of an image processing device 1 according to a first embodiment of the invention.

FIG. 1 is a diagram schematically illustrating the structure of an on-vehicle image processing device 1 according to a first embodiment of the invention. The on-vehicle image processing device 1 according to this embodiment is applicable to, for example, a drive assist system that acquires the amount of movement of a vehicle from image information and controls the driving of the vehicle.

As shown in FIG. 1, the on-vehicle image device 1 according to this embodiment includes an information acquiring unit 50 and an ECU 10. The ECU (electronic control unit) is a computer that electronically controls vehicle devices, and includes, for example, a CPU (central processing unit), a ROM (read only memory), a RAM (random access memory), and an input/output interface.

The information acquiring unit 50 includes a first camera (first imaging unit) 51. The first camera 51 includes an image sensor that acquires the image information of the periphery of a vehicle. For example, a CCD (charge coupled device) image sensor or a CMOS (complementary metal oxide semiconductor) image sensor is used as the image sensor. The first camera 51 includes, for example, 480 pixels in the vertical directions and 640 pixels in the horizontal direction. In addition, the first camera 51 has a function of outputting the image information of a captured image to the ECU 10.

The ECU 10 includes an image thinning unit 11, a first specific region extracting unit (specific region extracting unit) 12, a second specific region extracting unit (specific region extracting unit) 13, a first correlation processing unit 15, a second correlation processing unit 16, a horizontal displacement detecting unit 18, a vertical displacement detecting unit 19, and a movement amount calculating unit (movement amount calculator) 20. The image thinning unit 11 has a function of thinning out the number of pixels of image information. The image thinning unit 11 receives image information from the first camera 51, and thins out the number of pixels of the image information. For example, when the number of pixels of the image information in the vertical direction is 480, the image thinning unit 11 removes even-numbered rows of pixels in the image from the upper side such that the number of pixels is 240. In addition, the image thinning unit 11 has a function of outputting the image information whose pixels are thinned out to the first specific region extracting unit 12 and the second specific region extracting unit 13. In each on-vehicle image processing device, the number of pixels in the horizontal direction may be thinned out, if necessary. For example, when the number of pixels in the horizontal direction is 640, the same thinning process as that in the vertical direction may be performed such that the number of pixels is 320.

The first specific region extracting unit 12 has a function of extracting a first region, which is a processing target, in order to calculate the amount of movement of the vehicle. The first specific region extracting unit 12 receives image information from the image thinning unit 11 and extracts a first specific region (first specific region) from an image region composed of the received image information. The first specific region is smaller than the entire image region and is extracted from a portion of the image region that is closer to the edge than to the center. For example, in the case of left-hand traffic, the first specific region is extracted from an upper left region in which an object serving as a feature point for image processing, such as a building, a traffic sign, an electric pole, or a tree, is likely to appear. In addition, the first specific region extracting unit 12 has a function of outputting the image information of the extracted first specific region to the first correlation processing unit 15.

The second specific region extracting unit 13 has a function of extracting a second region, which is a processing target, in order to calculate the amount of movement of the vehicle. The second specific region extracting unit 13 receives image information from the image thinning unit 11 and extracts a second specific region (second specific region) from an image region of the received image information. The second specific region is smaller than the entire image region and is extracted from a portion of the image region that is closer to the edge than to the center. For example, in the case of left-hand traffic, the second specific region is extracted from a lower right region in which an object serving as a feature point for image processing, such as a white line or a center divider, is likely to appear. As such, it is preferable that the position of the second specific region be acquired so as not to overlap the coordinates of the position of the first specific region, that is, the coordinates of the first specific region in the vertical and horizontal directions. In addition, the second specific region extracting unit 13 has a function of outputting the image information of the extracted second specific region to the second correlation processing unit 16.

The first correlation processing unit 15 has a function of detecting a feature point in the first specific region. The first correlation processing unit 15 receives the image information of the first specific region from the first specific region extracting unit 12 at a predetermined interval, searches and detects the feature point in the image information of the first specific region, using, for example, an optical flow process, and detects information related to the feature point, such as the movement position, moving direction, and moving speed of the feature point. In addition, the first correlation processing unit 15 has a function of outputting the detected information related to the feature point to the horizontal displacement detecting unit 18 and the vertical displacement detecting unit 19.

The second correlation processing unit 16 has a function of detecting the feature point in the second specific region. The second correlation processing unit 16 receives the image information of the second specific region from the second specific region extracting unit 13 at a predetermined interval, searches and detects the feature point in the image information of the second specific region, using, for example, an optical flow process, and detects information related to the feature point, such as the movement position, moving direction, and moving speed of the feature point. In addition, the second correlation processing unit 16 has a function of outputting the detected information related to the feature point to the horizontal displacement detecting unit 18 and the vertical displacement detecting unit 19.

The horizontal direction detecting unit 18 has a function of detecting a horizontal-direction component of the image on the basis of the information related to the feature point detected from the image information. The horizontal-direction component of the image is, for example, a horizontal-direction component of the moving direction or the moving speed of the image. The horizontal direction detecting unit 18 receives information related to the feature point from the first correlation processing unit 15 and the second correlation processing unit 16 and detects the horizontal-direction component of the image from a predetermined correlation between the feature point in the image information of the first specific region and the feature point in the image information of the second specific region, for example, a correlation between the movement positions, a correlation between the moving directions, or a correlation between the moving speeds. In addition, the horizontal direction detecting unit 18 has a function of outputting the detected horizontal-direction component to the movement amount calculating unit 20.

The vertical direction detecting unit 19 has a function of detecting a vertical-direction component of the image on the basis of the information related to the feature point detected from the image information. The vertical-direction component of the image is, for example, a vertical-direction component of the moving direction or the moving speed of the image. The vertical direction detecting unit 19 receives information related to the feature point from the first correlation processing unit 15 and the second correlation processing unit 16 and detects the vertical-direction component of the image from a predetermined correlation between the feature point in the image information of the first specific region and the feature point in the image information of the second specific region, for example, a correlation between the movement positions, a correlation between the moving directions, or a correlation between the moving speeds. In addition, the vertical direction detecting unit 19 has a function of outputting the detected vertical-direction component to the movement amount calculating unit 20.

The movement amount calculating unit 20 has a function of calculating the amount of movement of the vehicle. The movement amount calculating unit 20 receives the horizontal-direction component and the vertical-direction component of the image from the horizontal direction detecting unit 18 and the vertical direction detecting unit 19, and calculates the amount of movement of the vehicle in the yaw direction from the horizontal-direction component, the amount of movement of the vehicle in the pitch direction from the vertical-direction component, and the amount of movement of the vehicle in the roll direction from the horizontal-direction component and the vertical-direction component.

Figure 2:
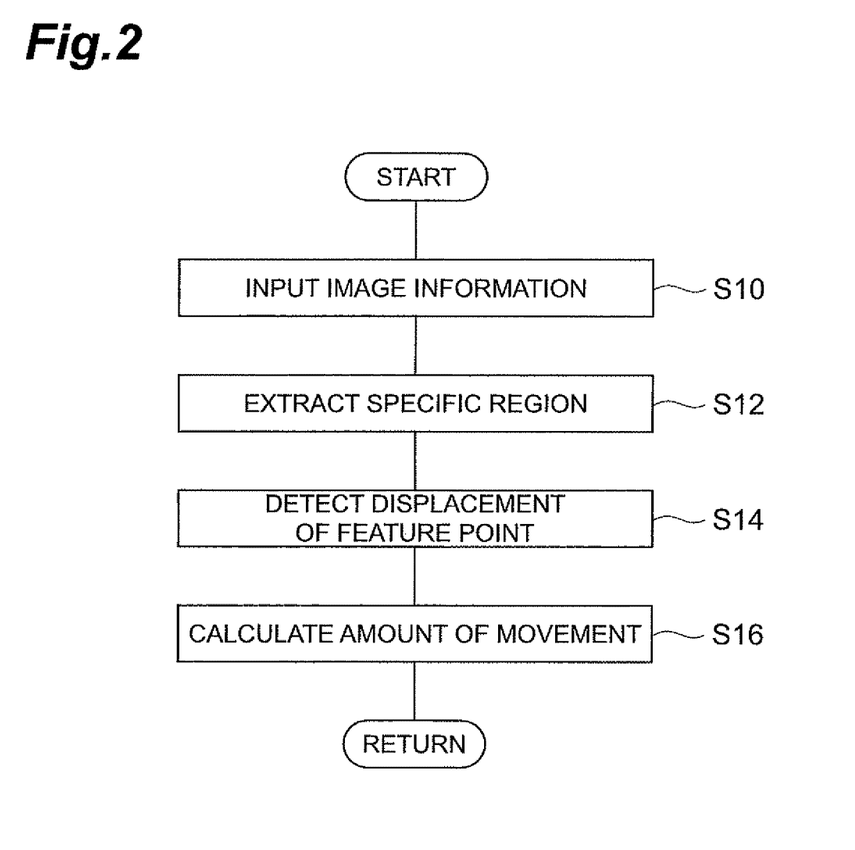
FIG. 2 is a flowchart illustrating the operation of the image processing device 1 shown in FIG. 1.
Figure 3:
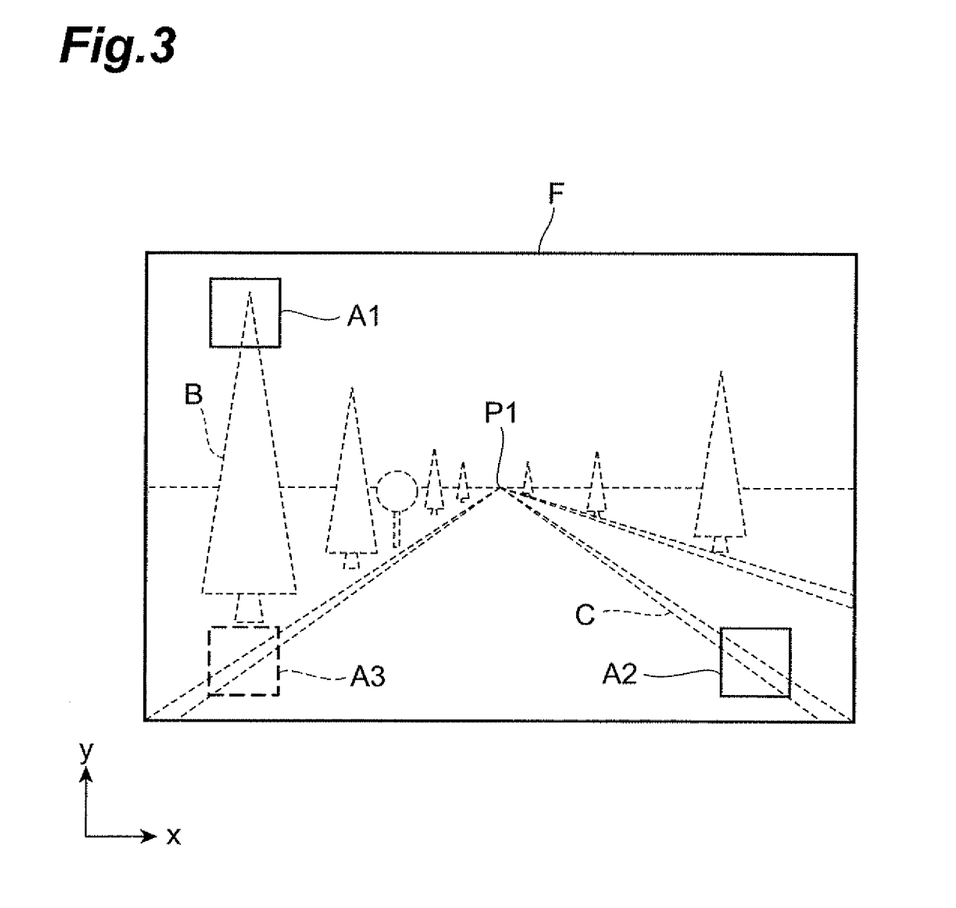
FIG. 3 is a diagram illustrating an example of the image to be processed by the image processing device 1 shown in FIG. 1.

Next, the operation of the on-vehicle image processing device 1 according to this embodiment will be described with reference to FIGS. 2 and 3. FIG. 2 is a flowchart illustrating the operation of the on-vehicle image processing device 1 according to this embodiment, and FIG. 3 is a diagram illustrating an example of the image to be processed by the on-vehicle image processing device 1. The process of the flowchart shown in FIG. 2 is repeatedly executed at a predetermined interval, for example, at the time when a drive assist button in the vehicle is turned on. For ease of understanding of the explanation, a process when the horizontal direction of the image shown in FIG. 3 is represented by x, the vertical direction thereof is represented by y, and drivers keep to the left side of the road will be described.

As shown in FIG. 2, first, the on-vehicle image processing device 1 receives image information (S10). Step S10 is performed by the information acquiring unit 50 to receive image information. The information acquiring unit 50 receives, for example, the image information shown in FIG. 3 from the information acquiring unit 50. When Step S10 is completed, the on-vehicle image processing device proceeds to a specific region extracting process (S12).

Step S12 is performed by the first specific region extracting unit 12 and the second specific region extracting unit 13 to extract specific regions from the image information. As shown in A1 of FIG. 3, for example, the first specific region extracting unit 12 extracts a specific region that is smaller than the image region and is closer to the edge F1 than to the center P1 of the image region. Since left-hand traffic is assumed in this embodiment, the first specific region extracting unit 12 extracts a first specific region A1 from an upper left region of the image. The image of a tree B is displayed as a feature point in the first specific region A1. In addition, as shown in A2 of FIG. 3, for example, the second specific region extracting unit 13 extracts a specific region that is smaller than the image region and is closer to the edge F1 than to the center P1 of the image region. Since left-hand traffic is assumed in this embodiment, the second specific region extracting unit 13 extracts a second specific region A2 from an upper right region of the image. The image of a white line C is displayed as a feature point in the second specific region A2. When Step S12 is completed, the on-vehicle image processing device proceeds to a process of detecting the displacement of the feature point (S14).

Step S14 is performed by the first correlation processing unit 15, the second correlation processing unit 16, the horizontal displacement detecting unit 18, and the vertical displacement detecting unit 19 to detect the displacement of the feature point in a specific region of the image. The first correlation processing unit 15 and the second correlation processing unit 16 compare the current image information with the previously input image information and extract the feature points in the images of the first specific region A1 and the second specific region A2. The horizontal displacement detecting unit 18 receives information related to the feature point of the first specific region A1 extracted by the first correlation processing unit 15 and information related to the feature point of the second specific region A2 extracted by the second correlation processing unit 16. Then, the horizontal displacement detecting unit 18 detects, for example, displacement in the x direction shown in FIG. 3 from a predetermined correlation between the information related to the feature point of the first specific region A1 and the information related to the feature point of the second specific region A2. The vertical displacement detecting unit 19 receives the information related to the feature point of the first specific region A1 extracted by the first correlation processing unit 15 and the information related to the feature point of the second specific region A2 extracted by the second correlation processing unit 116. Then, the horizontal displacement detecting unit 18 detects, for example, displacement in the y direction shown in FIG. 3 from a predetermined correlation between the information related to the feature point of the first specific region A1 and the information related to the feature point of the second specific region A2. When Step S14 is completed, the on-vehicle image processing device proceeds to a process of calculating the amount of movement (S16).

Step S16 is performed by the movement amount calculating unit 20 to calculate the amount of movement of the vehicle on the basis of the displacement of the feature point obtained in Step S14. The movement amount calculating unit 20 calculates the amounts of movement of the vehicle in the yaw direction, the pitch direction, and the roll direction, on the basis of the displacements in the x direction and the y direction. When Step S16 is completed, the control process shown in FIG. 2 ends. As such, in the control process shown in FIG. 2, it is not necessary to process the entire image shown in FIG. 3, but only the first specific region A1 and the second specific region A2 are processed. Therefore, it is possible to perform image processing while ensuring the accuracy of image processing.

As described above, the image processing device 1 according to this embodiment can process only the first specific region A1 and the second specific region A2 in the image region composed of the captured image information. Therefore, it is possible to effectively perform image processing. In addition, portions of the image region that are closer to the edge F1 of the image region, in which the displacement of the captured feature point is large, than to the center P1 of the image region are extracted as the first specific region A1 and the second specific region A2. Therefore, it is possible to accurately check the displacement of the image in the vertical direction and the horizontal direction and thus calculate the amount of movement of the vehicle. As a result, it is possible to effectively calculate the amount of movement of the vehicle while ensuring accuracy. In addition, since the load of image processing is reduced, it is possible to increase the number of image processing operations per unit time and thus detect the amount of movement in a short period of time. As a result, it is possible to perform measurement with a temporal resolution higher than that in measurement using a yaw rate sensor. In addition, since a plurality of specific regions is provided, it is possible to accurately detect, for example, the rolling of the vehicle.

Further, in the case of left-hand traffic, the image processing device 1 according to this embodiment can extract an upper left region and a lower right region of the entire region of the image information with respect to the center as the first specific region A1 and the second specific region A2, respectively. Therefore, it is possible to accurately place objects serving as feature points, such as a building or a traffic sign disposed on the upper left side of the traveling direction, and a white line or a center divider disposed on the lower right side of the traveling direction, into the specific regions.

Second Embodiment

Next, an image processing device according to a second embodiment of the invention will be described.

Figure 4:
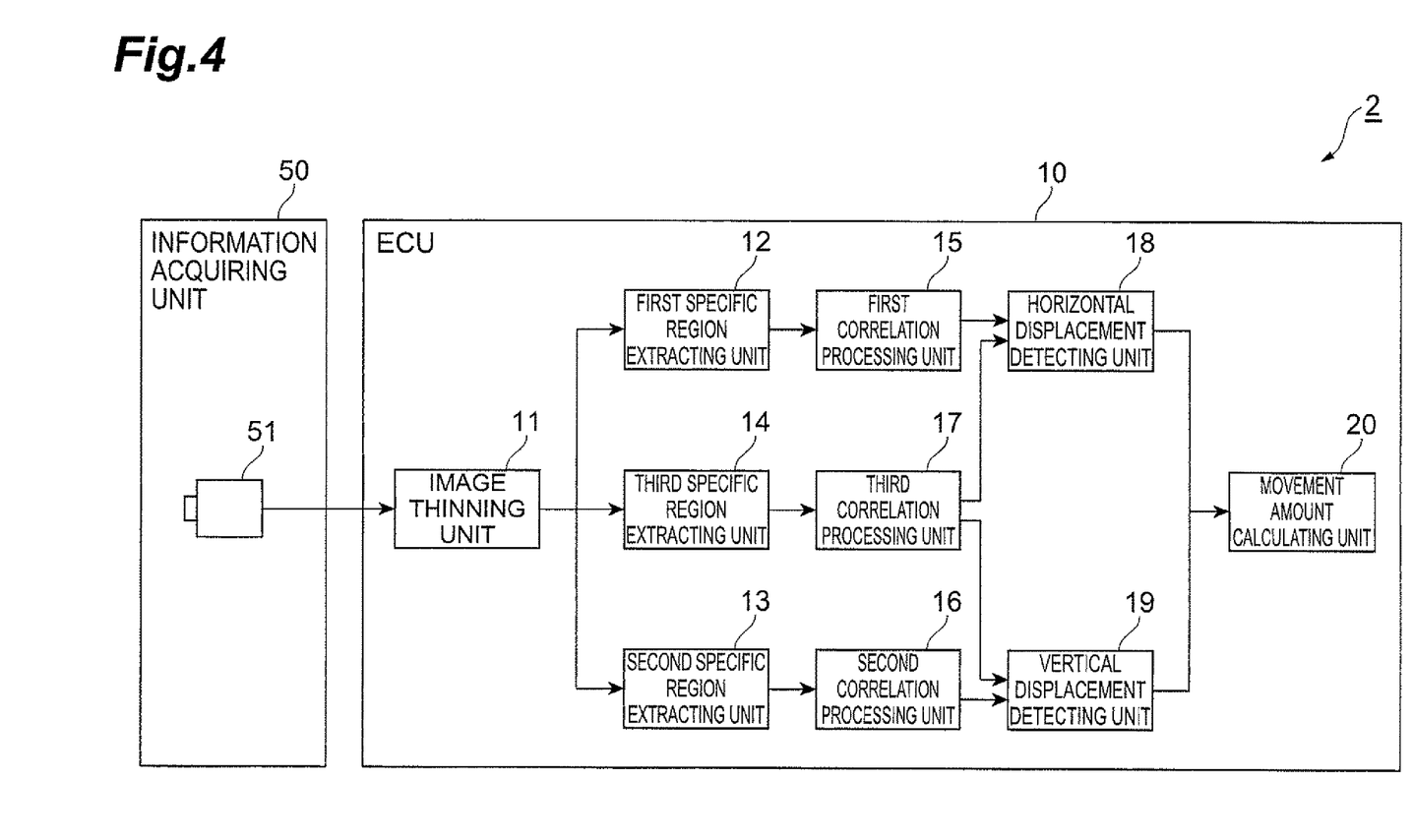
FIG. 4 is a diagram schematically illustrating the structure of an image processing device 2 according to a second embodiment of the invention.

An image processing device 2 according to the second embodiment has substantially the same structure as the image processing device 1 according to the first embodiment shown in FIG. 1 except that it includes a third specific region extracting unit 14 and a third correlation processing unit 17. Therefore, in the second embodiment, the same components as those in the first embodiment are denoted by the same reference numerals as those in the first embodiment, and a description thereof will be omitted. The third specific region extracting unit 14 and the third correlation processing unit 17 will be described in detail below.

FIG. 4 is a diagram schematically illustrating the structure of the image processing device 2 according to this embodiment. The image processing device 2 according to this embodiment includes an information acquiring unit 50 and an ECU 10. The ECU 10 includes the third specific region extracting unit 14 and the third correlation processing unit 17.

The third specific region extracting unit 14 has substantially the same structure as the first specific region extracting unit 12, and has a function of extracting a third region, which is a processing target, in order to calculate the amount of movement of a vehicle. The third specific region extracting unit 14 receives image information from the image thinning unit 11 and extracts a third specific region (third specific region) from the image region of the received image information. The third specific region is smaller than the image region and is extracted so as to overlap the y direction of the first specific region A1 and the x direction of the second specific region A2, as shown in FIG. 3. In addition, the third specific region extracting unit 14 has a function of outputting the image information of the extracted third specific region to the third correlation processing unit 17.

The third correlation processing unit 17 has a function of extracting a feature point in the third specific region. The third correlation processing unit 17 receives the image information of the third specific region at a predetermined interval from the third specific region extracting unit 14, searches and detects the feature point in the image information of the third specific region, using, for example, an optical flow process, and detects information related to the feature point, such as the moving direction and moving speed of the feature point. In addition, the third correlation processing unit 17 has a function of outputting the detected information related to the feature point to the horizontal displacement detecting unit 18 and the vertical displacement detecting unit 19.

Since the third correlation processing unit 17 is provided, the first correlation processing unit 15 provided in the ECU 10 outputs information related to the feature point only to the horizontal displacement detecting unit 18, and the second correlation processing unit 16 provided in the ECU 10 outputs information related to the feature point only to the horizontal displacement detecting unit 19.

According to the above-mentioned structure, the horizontal displacement detecting unit 18 can receive the image information of the specific regions A1 and A3 and detect the displacement of the image in the horizontal direction, and the vertical displacement detecting unit 19 can receive the image information of the specific regions A2 and A3 and detect the displacement of the image in the vertical direction. In this way, it is possible to perform image processing while ensuring the accuracy of image processing.

As described above, the image processing device 2 according to this embodiment can process only the first specific region A1, the second specific region A2, and the third specific region A3 in the image region composed of the captured image information. Therefore, it is possible to effectively perform image processing. In addition, portions of the image region that are closer to the edge F1 of the image region, in which the displacement of the captured object is large, than to the center P1 of the image region are extracted as the first specific region A1, the second specific region A2, and the third specific region A3. Therefore, it is possible to accurately check the displacement of the image in the vertical direction and the horizontal direction and thus calculate the amount of movement of the vehicle. As a result, it is possible to effectively calculate the amount of movement of the vehicle while ensuring accuracy. In addition, since the load of image processing is reduced, it is possible to increase the number of image processing operations per unit time and thus detect the amount of movement in a short period of time. As a result, it is possible to perform measurement with temporal resolution higher than that in measurement using, for example, a yaw rate sensor.

Further, in the case of left-hand traffic, the image processing device 2 according to this embodiment can extract an upper left region and a lower right region of the entire region of the image information with respect to the center as the first specific region A1 and the second specific region A2, respectively. Therefore, it is possible to accurately place objects serving as feature points, such as a building or a traffic sign disposed on the upper left side of the traveling direction, and a white line or a center divider disposed on the lower right side of the traveling direction, into the specific regions.

Third Embodiment

Next, an image processing device according to a third embodiment of the invention will be described.

Figure 5:
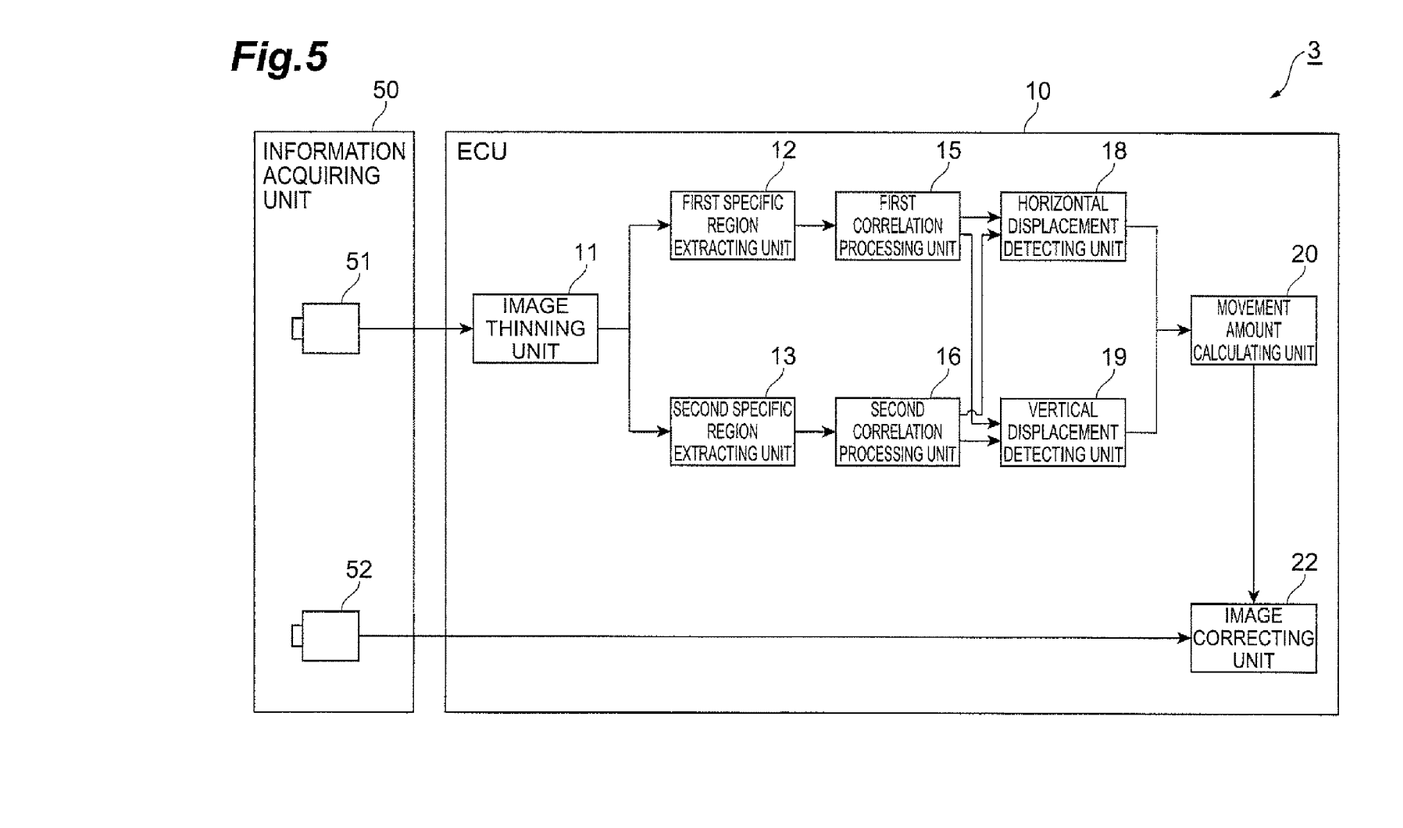
FIG. 5 is a diagram schematically illustrating the structure of an image processing device 3 according to a third embodiment of the invention.

An image processing device 3 according to the third embodiment has substantially the same structure as the image processing device 1 according to the first embodiment shown in FIG. 1 except that it includes a second camera (second imaging unit) 52 and an image correcting unit (first correcting unit) 22. Therefore, in the third embodiment, the same components as those in the first embodiment are denoted by the same reference numerals as those in the first embodiment and a detailed description thereof will be omitted. The second camera 52 and the image correcting unit 22 will be described in detail below.

Figure 6:
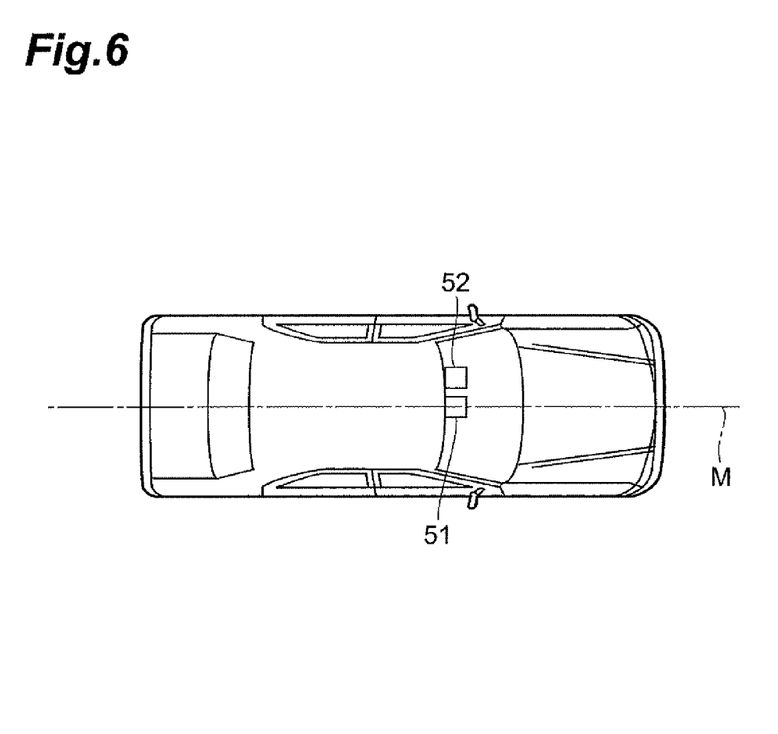
FIG. 6 is a diagram schematically illustrating the arrangement of cameras of the image processing device 3 shown in FIG. 5.
Figure 7:
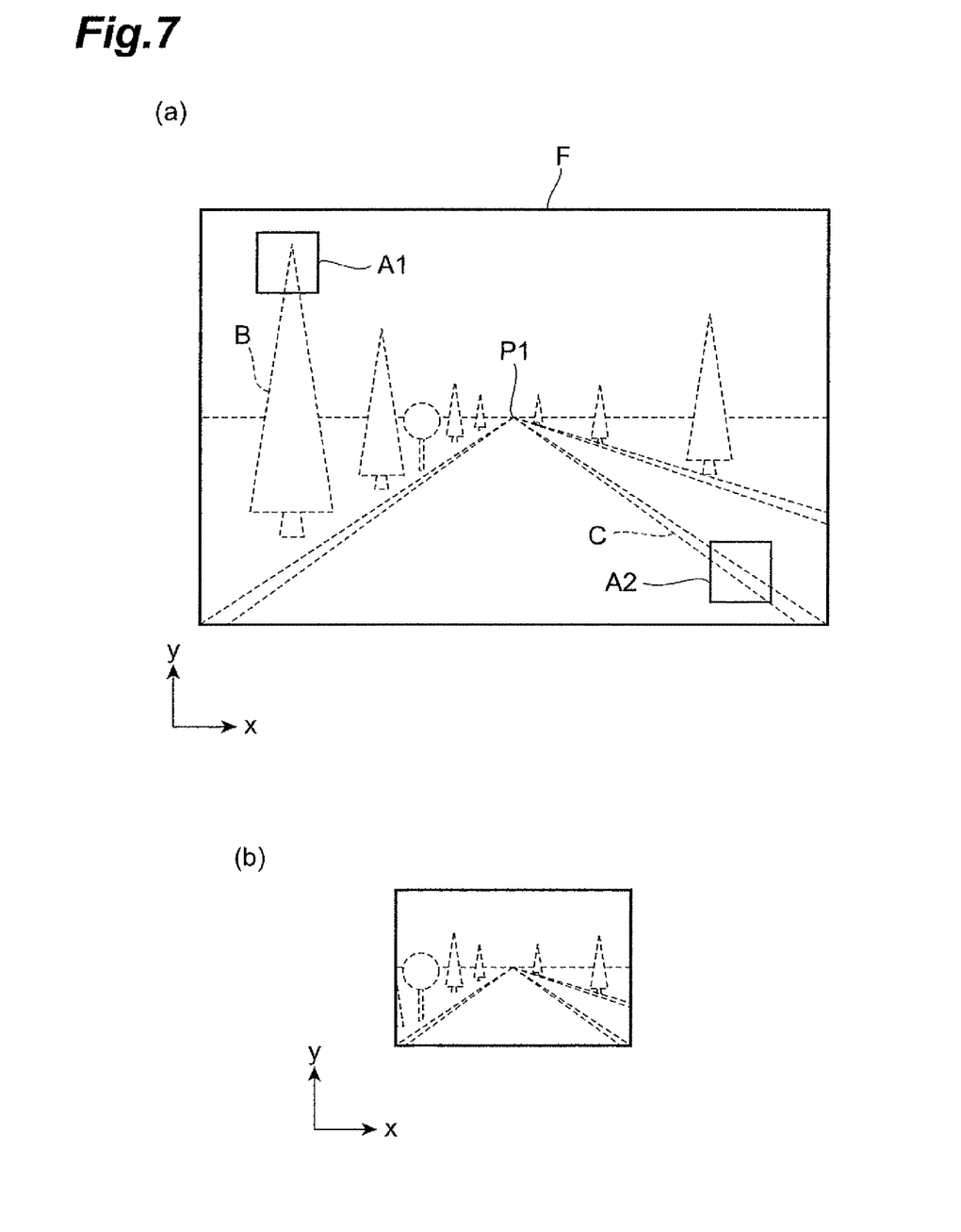
FIG. 7 is a diagram illustrating an example of the images to be processed by the image processing device 3 shown in FIG. 5.

FIG. 5 is a diagram schematically illustrating the structure of the image processing device 3 according to this embodiment, FIG. 6 is a diagram illustrating an example of the arrangement of an information acquiring unit 50 of the image processing device 3 according to this embodiment, and FIG. 7 is a diagram illustrating an example of the images with different angles of view, which will be processed by the information acquiring unit 50. The image processing device 3 according to this embodiment includes the information acquiring unit 50 and an ECU 10. The information acquiring unit 50 includes the second camera 52, and the ECU 10 includes the image correcting unit 22.

The second camera 52 includes an image sensor that acquires the image information of the periphery of a vehicle. For example, a CCD image sensor or a CMOS image sensor is used as the image sensor. The second camera 52 includes, for example, 480 pixels in the vertical directions and 640 pixels in the horizontal direction. The second camera 52 has an angle of view less than that of the first camera 51. In this embodiment, for example, a camera having an angle of view of ±20° in the horizontal direction is used as the first camera 51, and a camera having an angle of view of ±10° in the horizontal direction is used as the second camera 52. In addition, as shown in FIG. 6, the first camera and the second camera 52 are arranged at the upper center of a front glass 61 of a vehicle 60. For example, the first camera 51 is arranged on a center line M that is aligned with the traveling direction of the vehicle, and the second camera is arranged in the vicinity of the first camera. In addition, the second camera 52 has a function of outputting captured image information to the image correcting unit 22.

The image correcting unit 22 has a function of correcting the image input from the second camera 52. The image correcting unit 22 receives the amount of movement that is calculated from the image captured by the first camera 51 from the movement amount calculating unit 20, and corrects the image captured by the second camera 52.

As shown in FIG. 7, in the image processing device 3 having the above-mentioned structure, the first camera captures an image (a) and the second camera captures an image (b). The amount of image information included in the image (a) is more than that of the image (b) in the imaging direction.

The image processing device 3 calculates the amount of movement of the vehicle from the image (a) having a wide angle of view using the same method as that in the first embodiment and corrects the image (b) affected by the movement components of the vehicle on the basis of the calculated amount of movement.

As described above, the image processing device 3 according to this embodiment can process only the first specific region A1 and the second specific region A2 in the image region composed of the captured image information. Therefore, it is possible to effectively perform image processing. In addition, portions of the image region that are closer to the edge F1 of the image region, in which the displacement of the captured object is large, than to the center P1 of the image region are extracted as the first specific region A1 and the second specific region A2. Therefore, it is possible to accurately check the displacement of the image in the vertical direction and the horizontal direction and thus calculate the amount of movement of the vehicle. As a result, it is possible to effectively calculate the amount of movement of the vehicle while ensuring the accuracy. In addition, since the load of image processing is reduced, it is possible to increase the number of image processing operations per unit time and thus detect the amount of movement in a short period of time. As a result, it is possible to perform measurement with temporal resolution higher than that in measurement using, for example, a yaw rate sensor.

In addition, in the case of left-hand traffic, the image processing device 3 according to this embodiment can extract an upper left region and a lower right region of the entire region of the image information with respect to the center as the first specific region A1 and the second specific region A2, respectively. Therefore, it is possible to accurately place objects serving as feature points, such as a building or a traffic sign disposed on the upper left side of the traveling direction, and a white line or a center divider disposed on the lower right side of the traveling direction, into the specific regions.

Further, according to the image processing device 3 of this embodiment, it is possible to acquire a plurality of images using the cameras 51 and 52 with different angles of view. In this case, the amount of image information of the image captured by the first camera 51, which has an angle of view more than that that of the second camera, is more than that of the image captured by the second camera 52 in the imaging direction. Therefore, the image captured by the first camera 51 is used to detect the displacement of an object, which makes it possible to check the displacement of the image more accurately. As such, when the cameras 51 and 52 with different angles of view are provided, the image captured by the first camera 51 with a large angle of view is used to calculate the amount of movement of the vehicle, and the image captured by the second camera 52 is corrected on the basis of the calculated amount of movement of the vehicle. Therefore, it is possible to correct an image accurately.

Fourth Embodiment

Next, an image processing device according to a fourth embodiment of the invention will be described.

Figure 8:
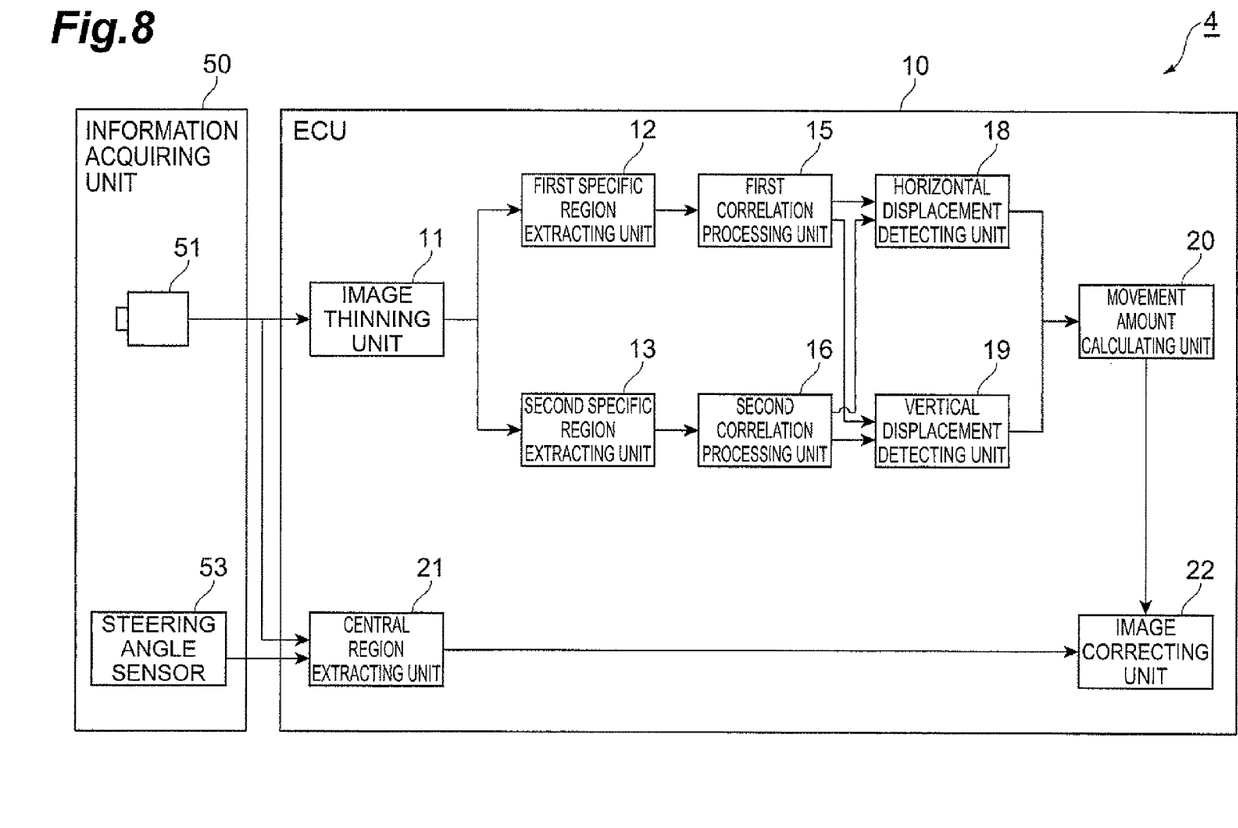
FIG. 8 is a diagram schematically illustrating the structure of an image processing device 4 according to a fourth embodiment of the invention.

An image processing device 4 according to the fourth embodiment has substantially the same structure as the image processing device 1 according to the first embodiment shown in FIG. 1 except that it includes a steering angle sensor 53, a central region extracting unit (central region extractor) 21, and an image correcting unit (second correcting unit) 22. In the fourth embodiment, the same components as those in the first embodiment are denoted by the same reference numerals as those in the first embodiment, and a description thereof will be omitted. The steering angle sensor 53, the central region extracting unit 21, and the image correcting unit 22 will be described in detail below.

Figure 9:
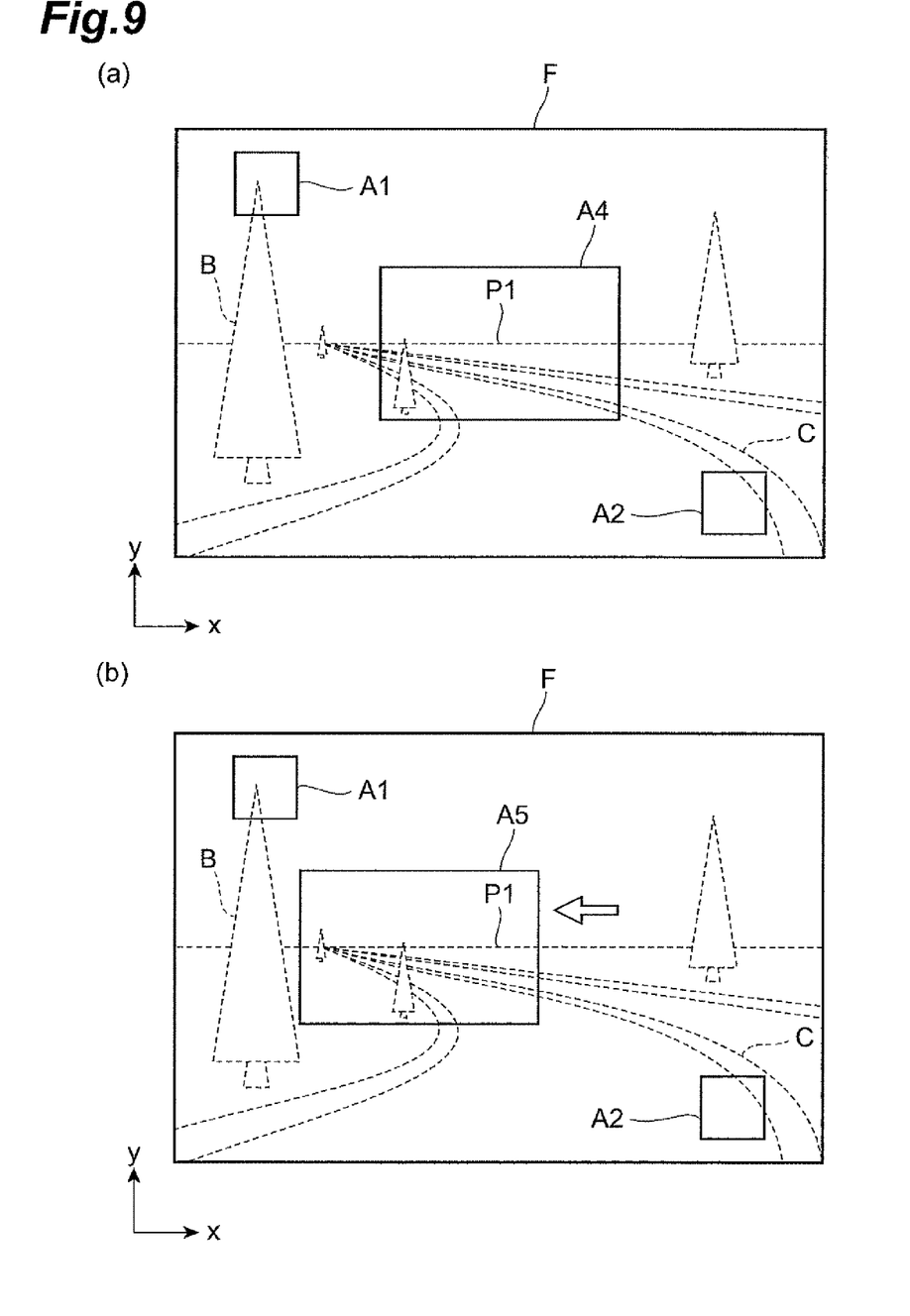
FIG. 9 is a diagram illustrating an example of the images to be processed by the image processing device 4 shown in FIG. 8.

FIG. 8 is a diagram schematically illustrating the structure of the image processing device 4 according to this embodiment, and FIG. 9 is a diagram illustrating an example of the images to be processed by an information acquiring unit 50 of the image processing device 3 according to this embodiment. The image processing device 4 according to this embodiment includes the information acquiring unit 50 and an ECU 10. The information acquiring unit 50 includes the steering angle sensor 53 and the ECU 10 includes the central region extracting unit 21 and the image correcting unit 22.

The steering angle sensor 53 is a sensor that detects the rotation angle of a steering wheel. The steering angle sensor 53 has a function of detecting the steering angle and outputting the detected steering angle to the central region extracting unit 21.

The central region extracting unit 21 has a function of extracting a central portion of the image input from the first camera 51 according to the steering angle. For example, as shown in (a) of FIG. 9, when the steering wheel is not operated, the central region extracting unit extracts a central region A4 that is disposed at the center of the image. As shown in (b) of FIG. 9, when the steering wheel is operated to the left side, the central region extracting unit extracts the central region A4 from a region represented by A5 according to the magnitude of the steering angle. As such, the central region extracting unit has a function of sliding a region with a predetermined size on the basis of the steering angle input from the steering angle sensor 53 and extracting an image.

The image correcting unit 22 has a function of correcting the images of the central regions A4 and A5. The image correcting unit 22 receives the amount of movement that is calculated from the image captured by the first camera 51 from the movement amount calculating unit 20, and corrects the images of the central regions A4 and A5.

The image processing device 4 having the above-mentioned structure can acquire two types of images, that is, the images of the central regions A4 and A5 and the entire image, similar to the image processing device 3 according to the third embodiment. Therefore, similar to the third embodiment, the image processing device 4 can calculate the amount of movement on the basis of the entire image and correct the images of the central regions A4 and A5 on the basis of the calculated amount of movement.

As described above, the image processing device 4 according to this embodiment can process only the first specific region A1 and the second specific region A2 in the image region composed of the captured image information. Therefore, it is possible to perform image processing effectively. In addition, portions of the image region that are closer to the edge F1 of the image region, in which the displacement of the captured object is large, than to the center P1 of the image region are extracted as the first specific region A1 and the second specific region A2. Therefore, it is possible to accurately check the displacement of the image in the vertical direction and the horizontal direction and thus calculate the amount of movement of the vehicle. As a result, it is possible to effectively calculate the amount of movement of the vehicle while ensuring the accuracy. In addition, since the load of image processing is reduced, it is possible to increase the number of image processing operations per unit time and thus detect the amount of movement in a short period of time.

As a result, it is possible to perform measurement with temporal resolution higher than that in measurement using, for example, a yaw rate sensor.

Further, in the case of left-hand traffic, the image processing device 4 according to this embodiment can extract an upper left region and a lower right region of the entire region of the image information with respect to the center as the first specific region A1 and the second specific region A2, respectively. Therefore, it is possible to accurately place objects serving as feature points, such as a building or a traffic sign disposed on the upper left side of the traveling direction, and a white line or a center divider disposed on the lower right side of the traveling direction, into the specific regions.

Further, the image processing device 4 of this embodiment can acquire a plurality of images without using a plurality of cameras with different angles of view. The image processing device can extract the central regions A4 and A5, which are the central regions of image information, and correct the images of the central regions A4 and A5 on the basis of the amount of movement calculated from a specific region close to the edge F1 of the image region. In this case, the amount of image information of the entire image including the central regions A4 and A5 is more than that of the images of the central regions A4 and A5 in the imaging direction. Therefore, when the entire image is used to detect the displacement of an object, it is possible to check the displacement of the object more accurately. The images of the central regions A4 and A5 correspond to the images captured by a telephoto imaging unit (narrow-angle imaging unit), and the image of a specific region close to the edge F1 corresponds to an image captured by a wide-angle imaging unit, as compared to the third embodiment. Therefore, it is possible to correct telephoto image processing accurately using one image, without using two imaging units.

The image processing devices according to the above-described embodiments of the invention are just illustrative examples. The image processing device according to the invention is not limited thereto, but the image processing devices according to the above-described embodiments can be modified without departing from the scope and spirit described in the claims, or the invention can be applied to other devices.

For example, in the above-described embodiments, in the case of left-hand traffic, an upper left small region and a lower right small region of the image region with respect to the center are used as the specific regions. However, in the case of right-hand traffic, an upper right small region and a lower left small region of the image region with respect to the center are used as the specific regions.

In addition, in the above-described embodiments, the third specific region is extracted. However, the number of specific regions may be four or more, and a region obtained by adding a plurality of extracted specific regions may be smaller than the entire region. In this case, it is possible to obtain the effect of reducing a processing load.

INDUSTRIAL APPLICABILITY

According to the invention, it is possible to effectively perform image processing for calculating the amount of movement of a vehicle while maintaining the calculation accuracy of the amount of movement.

The invention claimed is:
1. An on-vehicle image processing device comprising:
a first imaging unit that captures a periphery of a vehicle as image information;

a specific region extracting unit that extracts a plurality of specific regions each of which is closer to an edge of an image region composed of the image information than to a center of the image region;

a movement amount calculating unit that calculates an amount of movement of the vehicle on the basis of movement information of feature points in the plurality of specific regions;

a second imaging unit that has an angle of view less than that of the first imaging unit; and a first image correcting unit that corrects an image captured by the second imaging unit on the basis of the amount of movement acquired by the movement amount acquiring unit.

2. The on-vehicle image processing device according to claim 1, wherein, in left-hand traffic, the specific region extracting unit extracts an upper left region of the image region with respect to the center as a first specific region and a lower right region of the image region with respect to the center as a second specific region.

3. An on-vehicle image processing device comprising:

a first camera configured to capture a periphery of a vehicle as image information; and an electronic control unit;

the electronic control unit configured to extract a plurality of specific regions each of which is closer to an edge of an image region composed of the image information than to a center of the image region;

the electronic control unit configured to calculate an amount of movement of the vehicle on the basis of movement information of feature points in the plurality of specific regions; and a second camera that has an angle of view less than that of the first camera;

the electronic control unit further configured to correct an image captured by the second camera on the basis of the amount of movement acquired by the electronic control unit.

4. The on-vehicle image processing device according to claim 3, wherein, in left-hand traffic, the electronic control unit is configured to extract an upper left region of the image region with respect to the center as a first specific region and a lower right region of the image region with respect to the center as a second specific region.

5. An on-vehicle image processing device comprising:

a first imaging unit that captures a single image that includes a periphery of a vehicle as image information;

a specific region extracting unit that extracts a plurality of specific regions each of which is closer to an edge of an image region composed of the image information than to a center of the image region;

a movement amount calculating unit that calculates an amount of movement of the vehicle on the basis of movement information of feature points in the plurality of specific regions;

a central region extracting unit that extracts a central region of the image region from the image region; and a second image correcting unit that corrects the image of the central region extracted by the central region extracting unit on the basis of the amount of movement acquired by the movement amount acquiring unit.

6. An on-vehicle image processing device comprising:

a first camera configured to capture a single image that includes a periphery of a vehicle as image information; and an electronic control unit;

the electronic control unit configured to extract a plurality of specific regions each of which is closer to an edge of an image region composed of the image information than to a center of the image region;

the electronic control unit configured to calculate an amount of movement of the vehicle on the basis of movement information of feature points in the plurality of specific regions;

the electronic control unit further configured to extract a central region of the image region from the image region; and the electronic control unit configured to correct the image of the central region on the basis of the amount of movement acquired by the electronic control unit.

7. The on-vehicle image processing device according to claim 6, wherein, in left-hand traffic, the specific region extracting unit extracts an upper left region of the image region with respect to the center as a first specific region and a lower right region of the image region with respect to the center as a second specific region.

8. The on-vehicle image processing device according to claim 6, wherein, in left-hand traffic, the electronic control unit is configured to extract an upper left region of the image region with respect to the center as a first specific region and a lower right region of the image region with respect to the center as a second specific region.

* * * * *